Patented Mar. 21, 1933

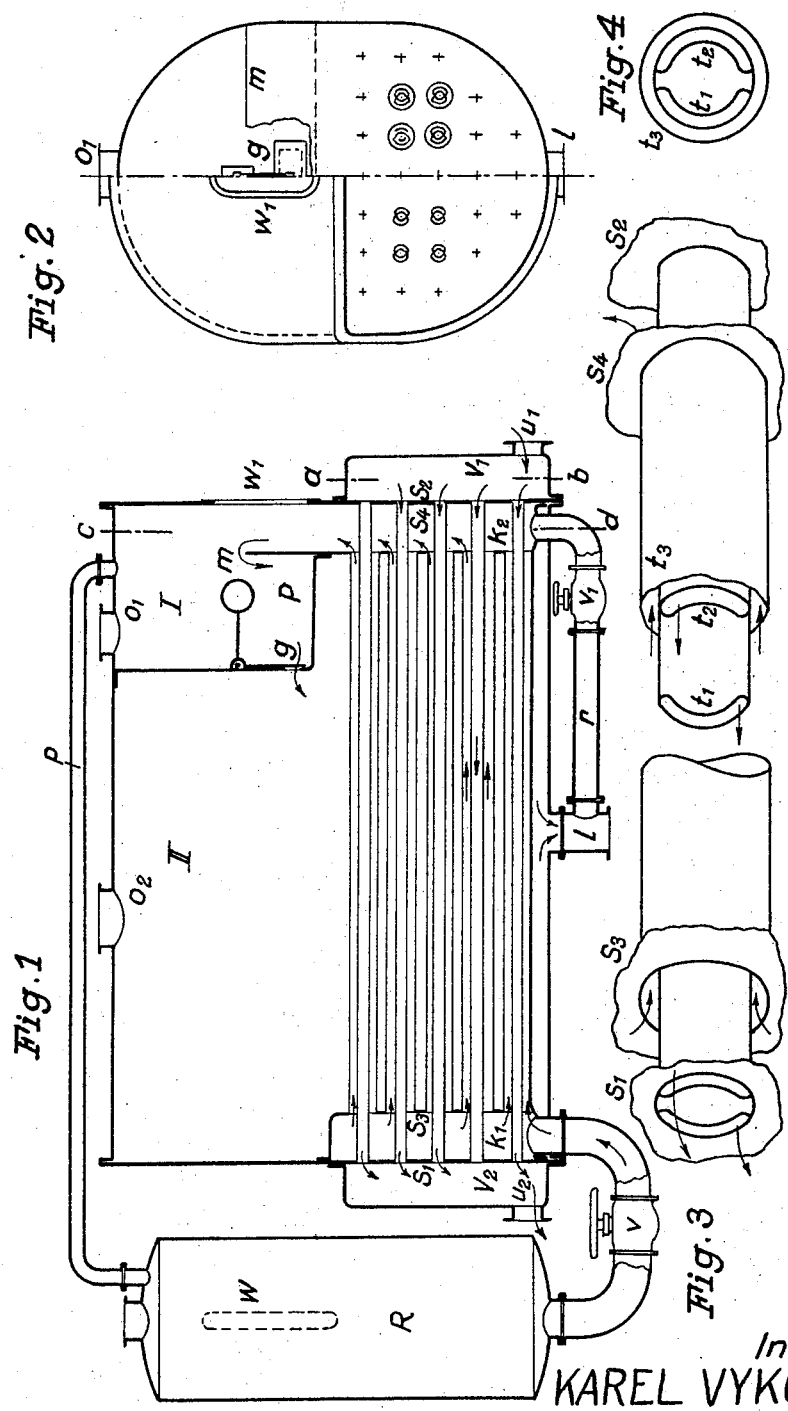

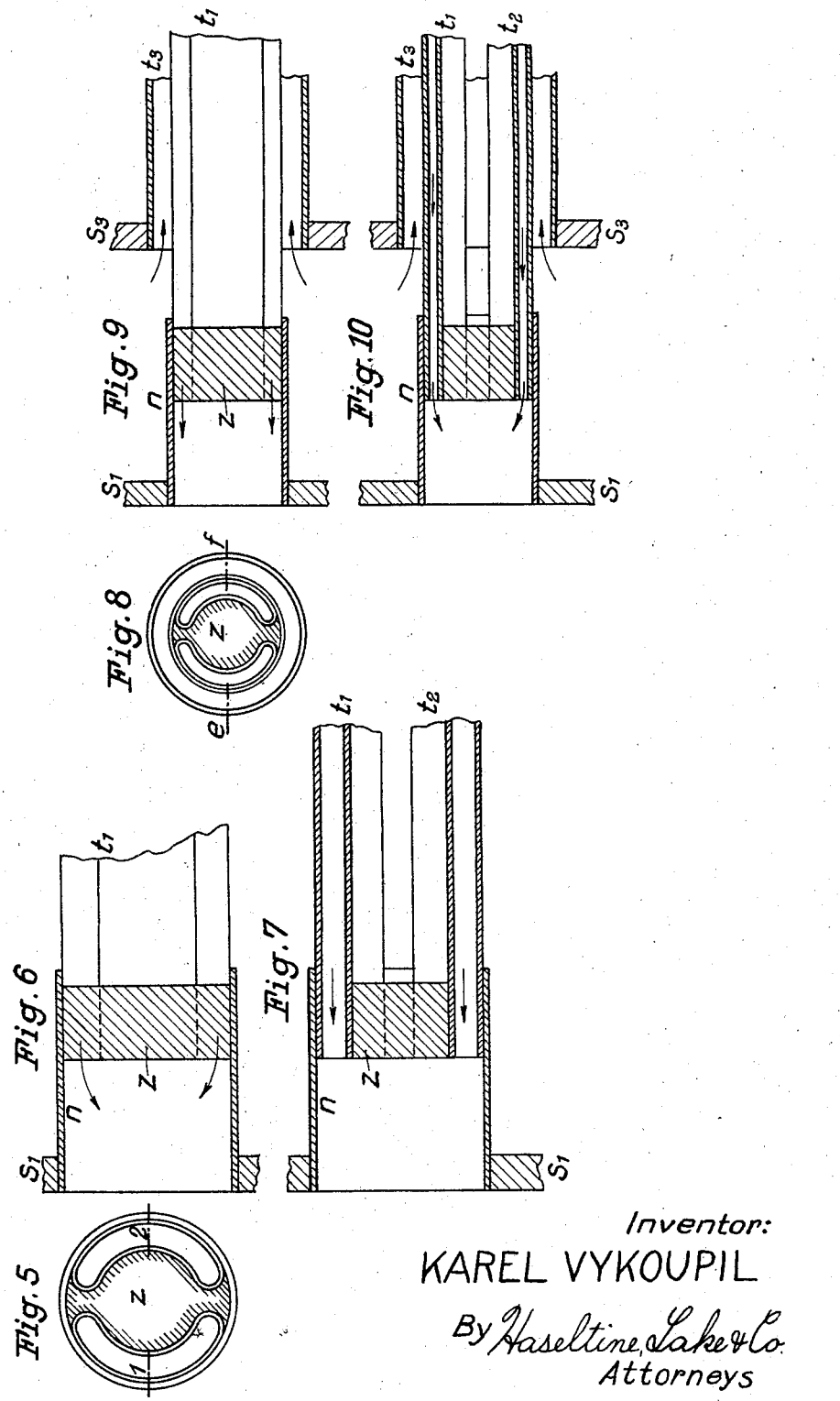

1,902,533

UNITED STATES PATENT OFFICE

KAREL VYKOUPIL, OF MARIAMPOL, LITHUANIA

EVAPORATOR

Application filed July 27, 1932, Serial No. 625,067, and in Czechoslovakia May 31, 1929.

The subject of this invention is an evaporator having two separate evaporating chambers connected together by a float-actuated valve, thus rendering possible the advantage of the use of different pressures in the two chambers. By using a lower pressure in the chamber surrounding the outer walls of the heating tubes through which flows the liquid to be evaporated, boiling and evaporating is obtained in the outer tubes also, thus increasing the efficiency of the evaporator.

According to this invention the heating tubes which are arranged within the evaporating tubes have an annular segmental cross section.

This arrangement enables the heating steam to be used advantageously and, as a result of the rapid flow which takes place round these tubes, the coefficient of heat transference is appreciably increased.

A constructional example of the evaporator according to this invention is shown in the drawings.

Figure 1 shows a schematic longitudinal section through the evaporator, Figure 2 shows a section on $a$—$b$ and $c$—$d$ respectively in Figure 1, Figure 3 shows a perspective view of the arrangement of the heating tubes, and Figures 4 to 10 show details of these tubes.

The evaporator according to this invention comprises two evaporating chambers I and II which are heated by a system of heating tubes.

The substance to be evaporated passes from the container R, which is provided with a gauge glass $w$, through the valve $v$ into the entrance chamber $k_1$. From here it flows through a system of tubes into the exist chamber $k_2$. The flow is produced either by a pump or by thermo-syphonic action. In the exit chamber $k_2$ the substance to be evaporated rises and passes over the bridge $m$. The boiling and clarifying ceases in the chamber P. The connection between the evaporating chambers I—II is formed by means of the float valve $g$. The substance to be evaporated reaches the chamber II through this valve, where it is further heated by the outer tubes $t_3$ and evaporated, if necessary, at a lower pressure than in the chamber I.

The thickened substance is drawn off below the evaporator at $l$. The vapour is removed from chamber I through the opening $o_1$ and from chamber II though the opening $o_2$.

The chamber I is connected with the free space of the container R by the tube $p$ which acts as a pressure equalizer.

The tube $r$ serves for the removal of all the substance to be evaporated, and is provided with a valve $v_1$, normally closed.

The heating tubes consist of inner and outer tubes. The inner tubes $p_1$ $p_2$ (Figure 4) have an annular segmental cross section, and heating steam flows through them in the direction from $k_2$ to $k_1$.

The outer tubes $t_3$ are preferably of circular section. Through these, and surrounding the inner tubes $t_1$ and $t_2$ flows the substance to be evaporated in the direction leading to the chamber $k_2$.

Details of the tubes are shown in Figures 3 to 10.

Sleeves $n$ are soldered on to the ends of the inner tubes $t_1$ and $t_2$ and are screwed into the walls $s_1$ and $s_2$. The sleeve $n$ and the stopper $z$ of lead or the like, which is cast in it, prevents the penetration of the heating medium into the heated chamber and vice versa. The outer tubes $t_3$ are screwed into the walls $s_3$ and $s_4$ in the usual way.

The evaporator operates on the opposed flow principle. The heating steam reaches the steam entrance chamber $v_1$ through the opening $U_1$, flows through the inner tubes $t_1$ and $t_2$ into the exit chamber $v_3$ and is passed out as condensate through the opening $U_2$.

A lower pressure may obtain in chamber I than in chamber II thus providing boiling and evaporating in the outer tubes $t_3$ also.

The arrangement described of the inner tubes results in a considerable increase of the heating surface per cubic metre of heating space in comparison with the known apparatus having simple or only circular section tubes, and also a considerable raising of the coefficient of heat transference, thus enabling a smaller evaporator to be used for the same heating surface. Experiments have shown that the total heating effect is improved by at least 16%.

What I claim and desire to secure by Letters Patent of the United States is:—

1. An evaporator having two evaporating chambers separated from one another, characterized in that these evaporating chambers (I, II) are connected together by means of a float valve ($g$) and are heated by a system of heating tubes ($t_1, t_2, t_3$) which consist of outer tubes ($t_3$) in which are carried inner tubes ($t_1, t_2$) through which latter the heating steam flows, the substance to be evaporated flowing through the outer tubes ($t_3$) into the first chamber (I) of the evaporator, while the second chamber (II) of the evaporator is heated by the outer tubes ($t_3$), and different pressures may be maintained in the two chambers.

2. An evaporator as in claim 1, characterized in that the inner tubes ($t_1, t_2$) of the system of heating tubes, through which the steam flows, have an annular segmental cross section.

3. An evaporator as in claim 1, characterized in that in the first evaporating chamber (I) a spill wall ($m$) is provided for the boiling mass, and a float valve ($g$) in the separating wall for controlling the passage of the substance into the second chamber (II), and between the two there is a stilling chamber for the boiling mass.

In testimony whereof I affix my signature.

KAREL VYKOUPIL.